United States Patent Office 3,089,068
Patented May 7, 1963

3,089,068
SERVOSYSTEM FOR REGULATING MAGNETIC FIELDS
Sidney Arthur Stuart, Emmer Green, Reading, England, assignor to the United Kingdom Atomic Energy Authority, London, England
Filed Nov. 12, 1959, Ser. No. 852,529
Claims priority, application Great Britain Nov. 18, 1958
4 Claims. (Cl. 318—28)

This invention relates to apparatus for stabilising electro-magnetic fields.

The invention provides an apparatus which can stabilise an electro-magnetic field with an accuracy of the order of one part in $10^6$.

The invention consists in an apparatus comprising a coil for suspension in an electro-magnetic field, D.C. supply means for said coil, restoring torque means for said coil, an oscillator coil in space relationship with the said coil such that the two coils are magnetically coupled, A.C. supply means of constant frequency for said oscillator coil, phase comparator means connected to compare the phases of the A.C. supply means and the said oscillator coil and having an output proportional to the difference between the said phases, and servo means actuated by said output to vary the current generating the said electro-magnetic field so as to keep the said electro-magnetic field constant.

The invention is illustrated in the accompanying drawing wherein.

Figure 1:
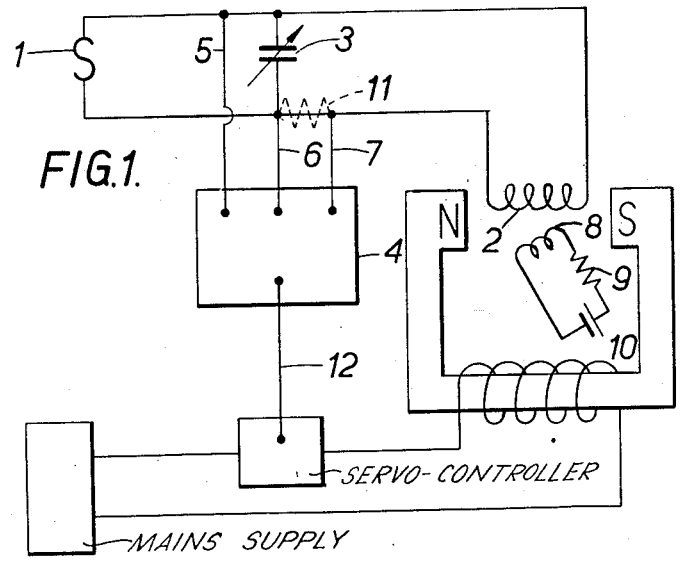
FIG. 1 is a semi-block diagram of the basic circuit.
Figure 2:
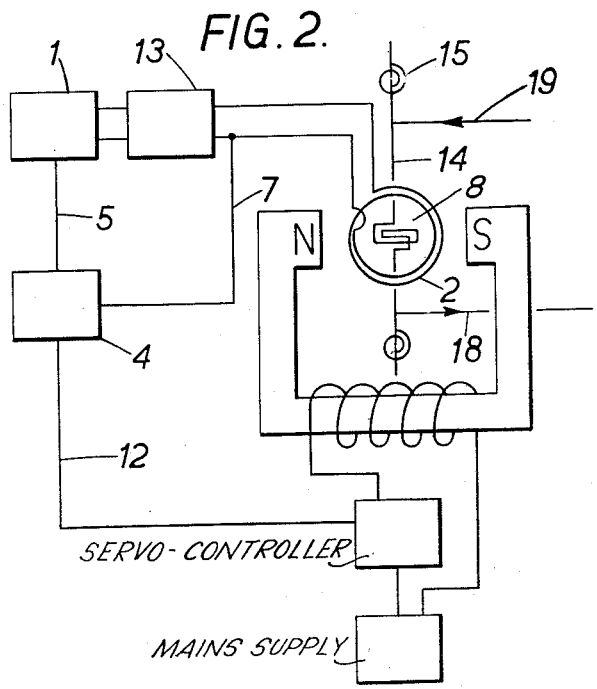
FIG. 2 is a semi-block circuit diagram of a preferred embodiment of the invention.

In FIG. 1 a constant frequency A.C. source 1 is connected across a coil 2 tuned by a variable capacitor 3. A phase comparator 4 is connected across source 1 by leads 5 and 6 and across coil 2 by leads 5 and 7. A suspended coil 8 having an intrinsic resistance 9 is connected across a stable D.C. source 10. Coils 2 and 8 are in the magnetic field to be stabilised and are coupled magnetically so that resistance 9 will be reflected or coupled impedance, as resistance 11, into coil 2 magnetically. An output lead 12 from the comparator 4 leads to the magnetic field generator and controls the current used to generate the field. In FIG. 2 a crystal oscillator 1 having a RF amplifier 13 is connected across an oscillator coil 2. A phase comparator 4 is connected by lead 5 to the oscillator coil 1 and by lead 7 to the oscillator coil 2. A coil 8 is suspended by a wire 14 within the magnetic field of oscillator coil 2. Coil 8 is free to rotate within the limits of a restoring torque represented by coil spring 15. A source of D.C. voltage feeds into an amplifier and a cathode follower (not shown). The cathode follower is connected by leads 18 and 19 across coil 8. An output lead 12 from comparator 4 leads to the controller of the generator of the magnetic field. The suspended coil 8 is supplied with current from the source via the cathode follower (not shown). The cathode follower also acts on the coil 8 as a load. Oscillator coil 2 is coupled magnetically to coil 8 and so the load on coil 8 is reflected into oscillator coil 2. The reflected impedance causes a phase shift in the oscillator coil 2. The phase of the crystal oscillator 1 is compared with the phase of the oscillator coil 2 by the comparator 4 and the output of the comparator 4 is used to control the current generating the magnetic field. Any change in field strength will cause an angular movement to coil 8 thereby changing the value of the reflected load in coil 2, and hence a phase shift. The phase shift in coil 2 is used to adjust the current generating the magnetic field until the phase shift is substantially zero, that is, the strength of the magnetic field is restored to its original value.

I claim:

1. Apparatus comprising a coil for suspension in an electro-magnetic field, D.C. supply means for said suspended coil, restoring torque means for said suspended coil, an oscillator coil in space relationship with the said suspended coil such that the two coils are magnetically coupled, A.C. supply means of constant frequency for said oscillator coil, phase comparator means connected to compare the phases of the A.C. supply means and the said oscillator coil and having an output proportional to the difference between the said phases, and coupling means for said output for connection to a servo means to vary the current generating the said electro-magnetic field so as to keep the said electro-magnetic field constant.

2. Apparatus as claimed in claim 1 wherein the A.C. supply means is a crystal oscillator.

3. Apparatus as claimed in claim 1 wherein a variable tuning capacitor is connected across the oscillator coil.

4. Apparatus as claimed in claim 1 wherein a servo means is connected to the servo means and a current responsive electro-magnetic field generation means is connected to said servo means.

References Cited in the file of this patent

UNITED STATES PATENTS

| | | |
|---|---|---|
| 2,697,186 | Anderson | Dec. 14, 1954 |
| 2,709,783 | Hare | May 31, 1955 |
| 2,713,661 | Schmitt | July 19, 1955 |